(12) United States Patent
Sjoblom et al.

(10) Patent No.: US 8,078,686 B2
(45) Date of Patent: Dec. 13, 2011

(54) HIGH PERFORMANCE FILE FRAGMENT CACHE

(75) Inventors: Erik Sjoblom, Clinton Township, MI (US); Louis Boydstun, Milford, OH (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 1055 days.

(21) Appl. No.: 11/535,439

(22) Filed: Sep. 26, 2006

(65) Prior Publication Data

US 2007/0124350 A1    May 31, 2007

Related U.S. Application Data

(60) Provisional application No. 60/720,758, filed on Sep. 27, 2005.

(51) Int. Cl.
    *G06F 15/167* (2006.01)
    *G06F 15/16* (2006.01)

(52) U.S. Cl. ........ 709/213; 709/214; 709/216; 709/217; 709/218; 709/219; 711/147; 711/148; 711/150; 711/153

(58) Field of Classification Search .................. 709/203, 709/214, 219, 228, 217, 206, 247, 218, 231; 711/121, 125, 141, 114, 206; 717/104; 707/205, 707/217, 8, 204, 693; 399/81; 710/1
See application file for complete search history.

(56) References Cited

U.S. PATENT DOCUMENTS

| | | | |
|---|---|---|---|
| 5,720,036 A | | 2/1998 | Garfinkle et al. |
| 6,792,424 B1 * | | 9/2004 | Burns et al. ............................ 1/1 |
| 6,874,015 B2 * | | 3/2005 | Kaminsky et al. ............ 709/214 |
| 7,409,497 B1 * | | 8/2008 | Kazar et al. .................... 711/114 |
| 7,490,140 B2 * | | 2/2009 | Goodman et al. ............ 709/219 |
| 7,834,784 B1 * | | 11/2010 | Zhang et al. ..................... 341/79 |
| 7,882,084 B1 * | | 2/2011 | Amdahl ....................... 707/693 |
| 2002/0112100 A1 * | | 8/2002 | Zimmerman et al. ............ 710/1 |
| 2002/0112125 A1 * | | 8/2002 | Copeland et al. ............. 711/125 |
| 2003/0005228 A1 * | | 1/2003 | Wong et al. .................... 711/121 |
| 2003/0069904 A1 * | | 4/2003 | Hsu et al. ....................... 707/204 |
| 2003/0149793 A1 * | | 8/2003 | Bannoura et al. ............. 709/247 |
| 2003/0204602 A1 * | | 10/2003 | Hudson et al. ................ 709/228 |
| 2003/0212571 A1 * | | 11/2003 | Sazawa et al. ..................... 705/1 |
| 2005/0015550 A1 | | 1/2005 | Challenger et al. |
| 2005/0027941 A1 * | | 2/2005 | Wang et al. .................... 711/121 |
| 2005/0071601 A1 * | | 3/2005 | Luick ............................ 711/206 |
| 2005/0144178 A1 * | | 6/2005 | Chrin et al. ................... 707/100 |
| 2006/0080510 A1 * | | 4/2006 | Benhase et al. ................ 711/136 |
| 2006/0190924 A1 * | | 8/2006 | Bruening et al. ............. 717/104 |
| 2006/0265436 A1 * | | 11/2006 | Edmond et al. ............... 707/204 |
| 2007/0101146 A1 * | | 5/2007 | Louch et al. .................. 713/176 |

(Continued)

OTHER PUBLICATIONS

Rodriguez et. al. "Dynamic parallel access to replicated content in the internet." IEEE/ACM Transactions on Networking (TON) (2002): 455-465.*

(Continued)

*Primary Examiner* — Douglas Blair
*Assistant Examiner* — Michael Martinez (57) ABSTRACT

A system, method, and computer program for caching a plurality of file fragments to improve file transfer performance, comprising the steps of exposing at least one file fragment of a computer file as a primary object to an application; caching said at least one file fragment at a plurality of points in a network system, wherein said at least one file fragment remains unchanged; and managing said at least one non-changing file fragment throughout said network system at a plurality of cache points and appropriate means and computer-readable instructions.

17 Claims, 8 Drawing Sheets

U.S. PATENT DOCUMENTS

| | | | |
|---|---|---|---|
| 2007/0124350 A1* | 5/2007 | Sjoblom et al. | 707/205 |
| 2007/0217811 A1* | 9/2007 | Bardolatzy et al. | 399/81 |
| 2007/0220000 A1* | 9/2007 | Walsh | 707/8 |
| 2007/0266169 A1* | 11/2007 | Chen et al. | 709/231 |
| 2008/0005273 A1* | 1/2008 | Agarwalla et al. | 709/217 |
| 2008/0133706 A1* | 6/2008 | Chavez et al. | 709/218 |
| 2008/0208985 A1* | 8/2008 | Georgis et al. | 709/206 |
| 2010/0122030 A1* | 5/2010 | Peters et al. | 711/114 |
| 2010/0281051 A1* | 11/2010 | Sheffi et al. | 707/770 |

OTHER PUBLICATIONS

Fan et. al. "Summary cache: a scalable wide-area Web cache sharing protocol." ACM SIGCOMM Computer Communication Review (1998): 254-65.*

Gadde et. al. "Reduce, reuse, recycle: an approach to building large Internet caches." Operating Systems, 1997., The Sixth Workshop on Hot Topics in (1997): 93-98.*

"Caching Strategy." IBM Corporation, 2004. Web. <http://publib.boulder.ibm.com/infocenter/wchelp/v5r6/index.jsp?topic=/com.ibm.commerce.admin.doc/concepts/cdcstrat.htm>.*

"Fragment Caching—Caching Parts of a Page." Geekswithblogs.net. Apr. 25, 2005. Web. <http://geekswithblogs.net/ranganh/archive/2005/04/25/37617.aspx>.*

* cited by examiner

HIGH PERFORMANCE FILE FRAGMENT CACHE

PRIORITY APPLICATION

The present application claims priority of U.S. provisional application Ser. No. 60/720,758 filed Sep. 27, 2005, which is incorporated herein by reference.

TECHNICAL FIELD

The presently preferred embodiment of the innovations described herein relate generally to file transfer performance. More specifically, the presently preferred embodiment relates to a system and method for caching streaming, and accelerating wide-area file transfers.

BACKGROUND

In the current graphics intensive industries of computer aided drafting and simulation, it is common to encounter resulting files that are so large they can take hundreds of hours to render. Likewise, it can be desirable to transfer those very large files from location to location for numerous reasons, e.g., programming, presentation or development. In a multi-site distributed network it is necessary to have those large files available to all who contribute to it. A common method for distribution uses peer-to-peer networks such as BitTorrent that downloads portions of the large file in anticipation of all the pieces being available for eventual combination into the large file. This technique is also referred to as caching as is seen with memory techniques to speed computer performance.

The drawback with the aforesaid peer-to-peer networks is the end result is always the whole file, the partial file fragments are an intermediate artifact of the larger file transfer. In this type of caching technique, partial file contents are not useful by themselves.

What is needed is a system that exposes fragments of files as primary objects to applications that can take advantage of those fragments, or logical sections of their data files, and manage and cache those fragments at all points of the system for enhanced performance and throughput.

SUMMARY

To achieve the foregoing, and in accordance with the purpose of the presently preferred embodiment as broadly described herein, the present application provides a method of caching a plurality of file fragments to improve file transfer performance, comprising the steps of exposing at least one file fragment of a computer file as a primary object to an application; caching said at least one file fragment at a plurality of points in a network system, wherein said at least one file fragment remains unchanged; and managing said at least one non-changing file fragment throughout said network system at a plurality of cache points. The method, comprising the additional step of requesting data having said file fragment associated therewith. The method, comprising the additional step of retrieving said file fragment from a shared cache, if said file fragment is present in said shared cache. The method, comprising the additional step of retrieving said file fragment from a private cache, if said file fragment is absent from a shared cache. The method, wherein said retrieval is authenticated by a security ticket. The method, comprising the additional step of displaying said file fragment from a shared cache to said application.

Another advantage of the presently preferred embodiment is to provide a method of accessing a cached file fragment, comprising the steps of requesting a file fragment by an application; receiving said file fragment, whereby said file fragment is available to a plurality of applications; and utilizing said file fragment. The method, wherein said file fragment is received from a shared mapped file memory on a first server.

A method of sending a cached file fragment, comprising the steps of receiving a request to access a file fragment on a first server; transmitting said file fragment if said file fragment is in a shared mapped file memory on said first server; retrieving said file fragment from a private memory cache on a second server, if said file fragment is absent from said shared mapped file memory on said first server; storing said retrieved file fragment from said private memory cache on said first server; and transmitting said file fragment. The method, wherein said receiving step and said transmitting steps are in relation to an application.

And another advantage of the presently preferred embodiment is to provide a computer-program product tangibly embodied in a machine readable medium to perform a method, comprising instructions for exposing at least one file fragment of a computer file as a primary object to an application; instructions for caching said at least one file fragment at a plurality of points in a network system, wherein said at least one file fragment remains unchanged; and instructions for managing said at least one non-changing file fragment throughout said network system at a plurality of cache points. The computer-program product, comprising the additional step of requesting data having said file fragment associated therewith. The computer-program product, comprising the additional step of retrieving said file fragment from a shared cache, if said file fragment is present in said shared cache. The computer-program product, comprising the additional step of retrieving said file fragment from a private cache, if said file fragment is absent from a shared cache. The computer-program product, wherein said retrieval is authenticated by a security ticket. The computer-program product, comprising the additional step of displaying said file fragment from a shared cache to said application.

Yet another advantage of the presently preferred embodiment is to provide a computer-program product tangibly embodied in a machine readable medium to perform a method of accessing a cached file fragment, comprising instructions for requesting a file fragment by an application; instructions for receiving said file fragment, whereby said file fragment is available to a plurality of applications; and instructions for utilizing said file fragment. The computer-program product, wherein said file fragment is received from a shared mapped file memory on a first server.

And yet another advantage of the presently preferred embodiment is to provide a computer-program product tangibly embodied in a machine readable medium to perform a method of sending a cached file fragment, comprising instructions for receiving a request to access a file fragment on a first server; instructions for transmitting said file fragment if said file fragment is in a shared mapped file memory on said first server; instructions for retrieving said file fragment from a private memory cache on a second server, if said file fragment is absent from said shared mapped file memory on said first server; instructions for storing said retrieved file fragment from said private memory cache on said first server; and instructions for transmitting said file fragment.

Still another advantage of the presently preferred embodiment is to provide a data processing system having at least a processor and accessible memory to implement a method for caching a plurality of file fragments to improve file transfer performance, comprising means for exposing at least one file fragment of a computer file as a primary object to an application; means for caching said at least one file fragment at a plurality of points in a network system, wherein said at least one file fragment remains unchanged; and means for managing said at least one non-changing file fragment throughout said network system at a plurality of cache points.

Other advantages of the presently preferred embodiment will be set forth in part in the description and in the drawings that follow, and, in part will be learned by practice of the presently preferred embodiment. The presently preferred embodiment will now be described with reference made to the following Figures that form a part hereof. It is understood that other embodiments may be utilized and changes may be made without departing from the scope of the presently preferred embodiment.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENTS

Figure 1:
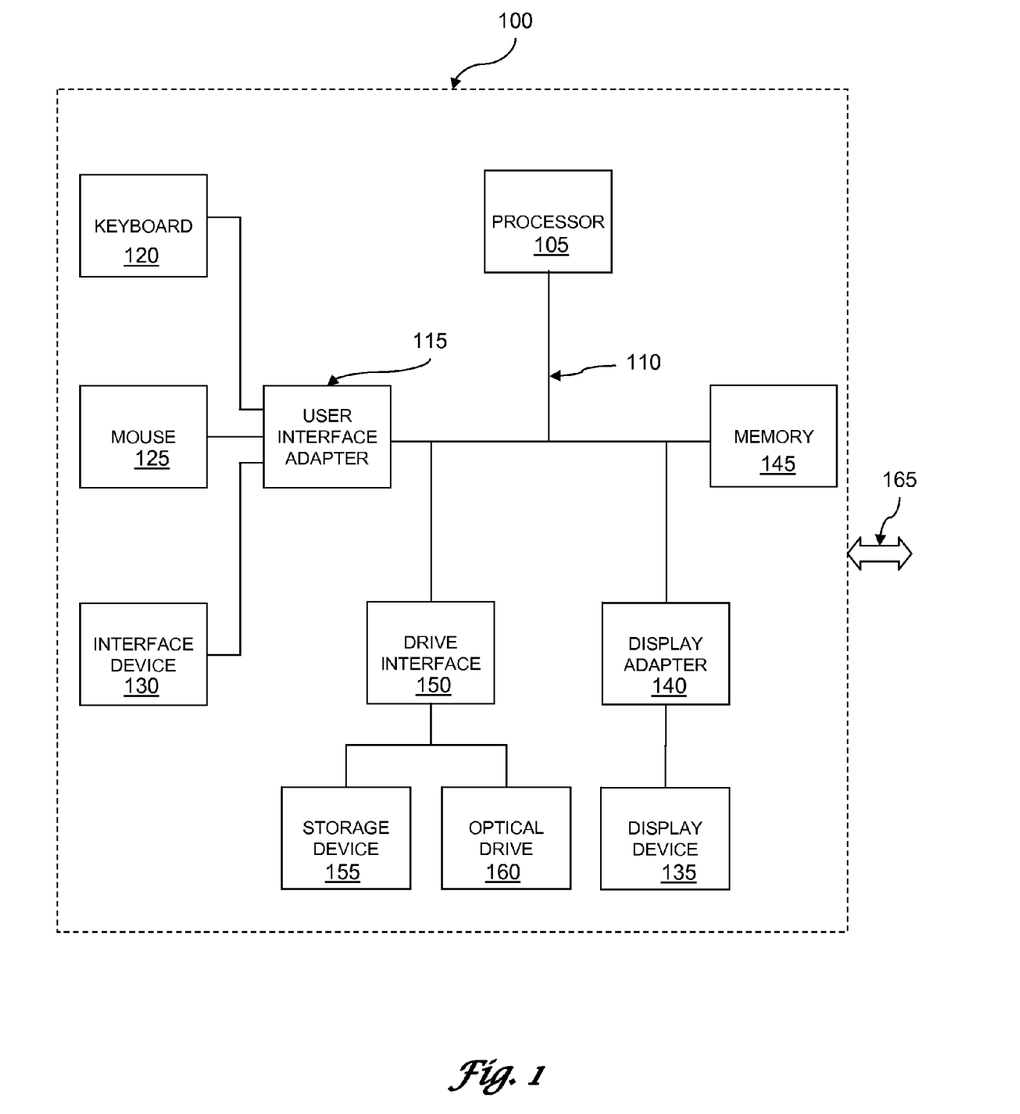
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of for caching streaming, and accelerating wide-area file transfers. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

Platform

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

System Architecture

Figure 2:
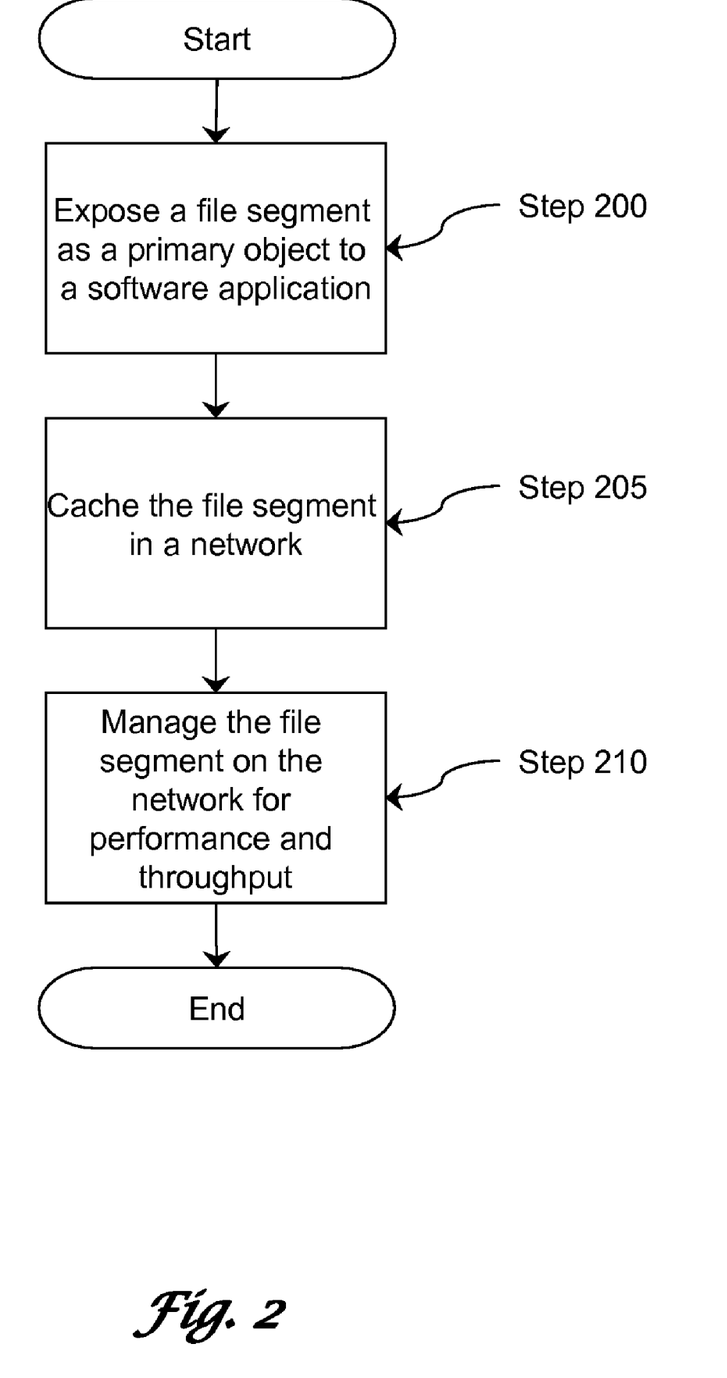
FIG. 2 is a flowchart of the major components for a file management system used in an enterprise system.

FIG. 2 is a flowchart of the major components for a file management system used in an enterprise system. The users on the enterprise system utilize a visualization or CAD application like NX® where data files are segmented into logical areas, and only some of the logical areas are required for any given operation. Referring to FIG. 2, a file segment is provided, or exposed, to a software application like NX® or Teamcenter®, developed by UGS Corp., that is capable to utilize fragments or logical sections of data files as primary objects (Step 200). The file segments used by the software applications are cached in servers throughout the enterprise system (Step 205). The file segments are managed on the enterprise system network for performance and throughput (Step 210).

A file management services (FMS) system departs from traditional product lifecycle management (PLM) systems by providing a channel for data access that is separate from its primary PLM connection. This separation enables an administrator to put data close to a user, while storing PLM metadata in a central database. The design to separate the data connection from the PLM connection requires a security ticket to be passed between the PLM and FMS systems. FMS provides file access when a valid security ticket is presented. At the same time, FMS caches data as it passes through the system for both uploads and downloads, enabling rapid file data delivery when a valid security ticket is presented to the FMS cache servers (FCS). FMS manages cached data at both a private user and a shared server level.

Figure 3:
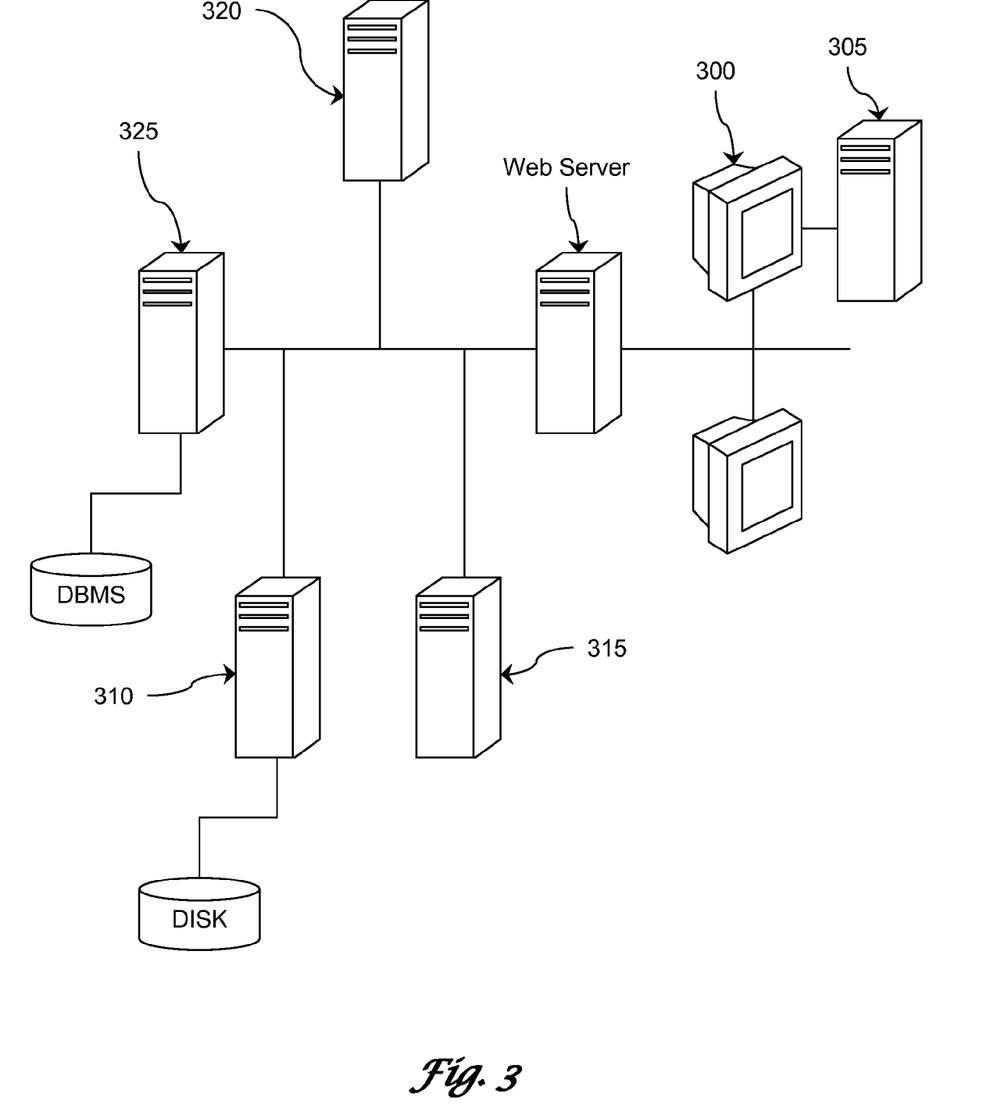
FIG. 3 is an exemplary diagram of a file management services system with example components.

FIG. 3 is an exemplary diagram of a file management services system with example components. As exemplified in FIG. 3, within a FMS Rich Client Interface 300 is a FMS Rich Client Cache (FCC) 305 having a primary function of caching recently accessed data in support of PLM rich clients, and provides a user cache that manages both downloaded and uploaded files. A FMS volume server 310 has a primary function of capturing and serving PLM files from reliable data storage sources. A FMS Cache Server (FSC) 315 has a primary function to decrease the latency of file delivery to end users by either putting FCS 315 close to the user, or by putting high performance FMS Cache Servers before the PLM volume servers. And finally, a FMS Configuration Server 320 has a primary function to read and distribute a master configuration file to other FMS servers and their client, which provides the administrator with the ability to centrally modify and maintain the FMS system from a central location. The user that reads and FMS file may result in a request that flows through the reliable FMS Volume Servers 310 if that file is not currently cached at any of the intermediate caches 305, 315, thereby indicating a first access.

Figure 4:
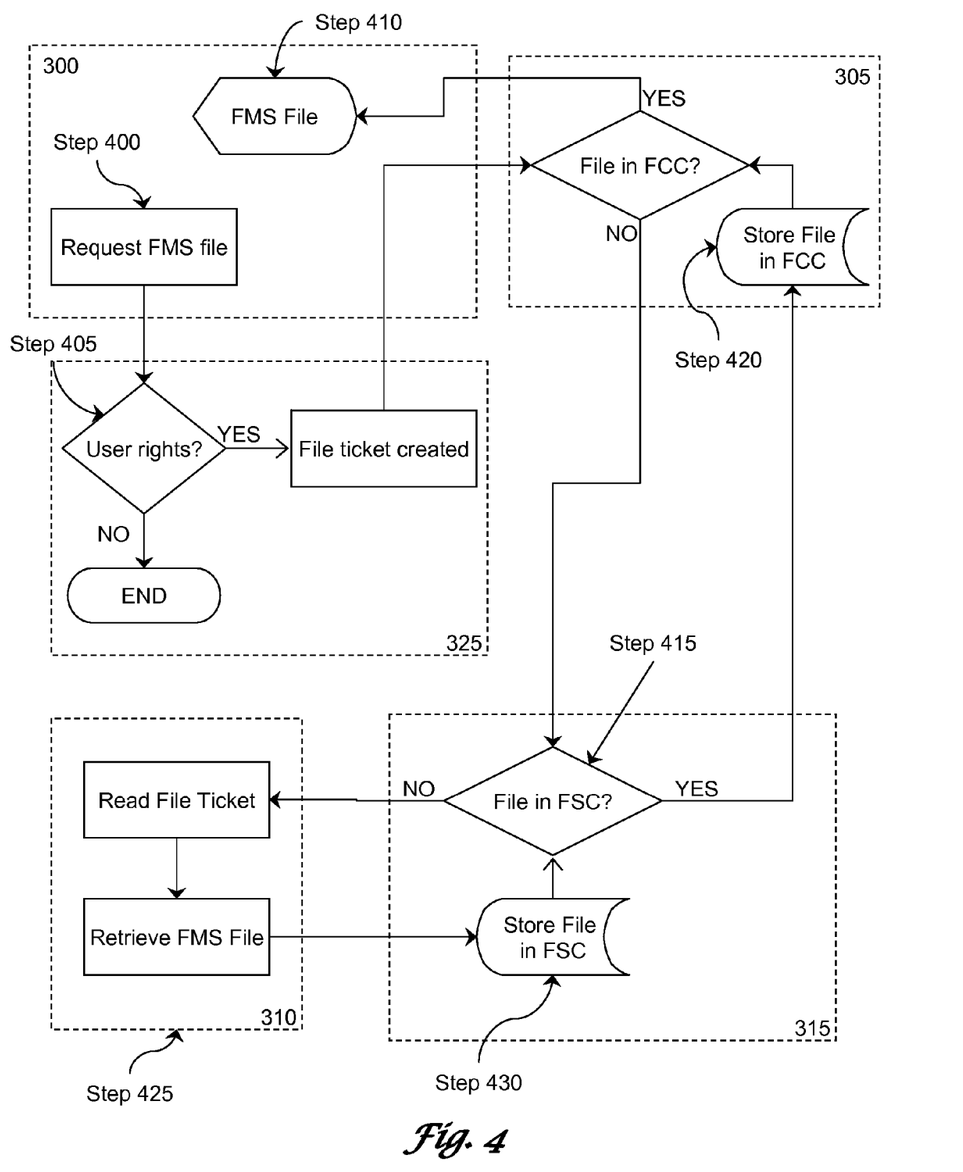
FIG. 4 is a process flow indicating the steps taken during a first access use-case.

FIG. 4 is a process flow indicating the steps taken during a first access use-case. As exemplified in FIG. 4, the user begins by requesting the FMS file while at a rich client user interface (Step 400). That request is sent to a business logic fileserver 325 that validates whether the user has access, and generates a security ticket (Step 405). Without user access, the FMS system exits due to insufficient or nonexistent access privileges.

Next the security ticket is received by the Rich Client Interface 300 and queries if the FCC 305 has the requested FMS File and displays it if so (Step 410). Otherwise, the FSC 315 receives the security ticket, validates the ticket, and checks whether it has the requested FMS File, where the FMS File is identified by a globally unique identifier (GUID) string and is preferably a file fragment, but may also be an entire data file (Step 415). If the FSC has the requested FMS File, then the FSC sends the requested FMS File to the FCC 305 for storage for that file (Step 420). When the entire FMS file has streamed down, the FMS returns the file path to the FMS Rich Client Interface 200 for display (Step 410). If the FSC 315 does not have the FMS File, the FSC 315 queries the FMS Volume Server 310 that receives the security ticket, validates the ticket, and serves the requested file to the FSC 315 (Step 425). The FSC 315 receives the FMS file from the FMS Volume Server 315 and streams it through to the FCC 305. The FSC 315 stores the FMS File bits (Step 430) as they stream through the server process. The FCC 305 receives the FMS file stream and stores it to the local client cache by the GUID string for that file (Step 420). When the entire FMS file has streamed down, FMS returns the file path to the FMS Rich Client Interface for display (Step 410). The system optimizes a batch retrieval of tickets not currently cached. For example, when a part node is expanded, all of the tickets for that sub-tree are retrieved. So, at the first access use-case there are preferably zero or one batch ticket calls.

The second and consecutive time the FMS file is accessed, it is already stored on one of the caches, either the FCC 305 or the FSC 315, requiring fewer processing steps and without requiring the passing of the FMS file request to the FMS Volume Servers 320. Writing to the FMS file also caches copies of itself along the path up to the FMS Volume Servers 320 with processes analagous to the read of the FMS file previously discussed (see Steps 400 through 430).

New files that are uploaded to the system are streamed up the FMS Volume Servers 320, and each cache along the route, e.g., FSC & FCC systems, stores a copy of the FMS file as it streams through the FMS system. To write a modified file fragment for client cached data, the user requests the file open or download on the FMS Rich Client Interface 300. The business logic file server 325 validates that the user has permissions to upload and associate the file with an object, and then generates a write ticket (and a GUID is created for the file) that is sent back to the FMS Rich Client Interface 300. The FMS Rich Client Interface 300 passes the write ticket and file to the FMS system and requests a file upload. The FMS system copies the file into the local client cache at the FCC 305, and uploads the file to the connected FMS cache server where the whole file (and associated GUID) is saved to cache. The FMS server cache receives the write ticket, validates the ticket, and then uploads the file to the connected FMS Server Cache 320, saving a copy of the stream data as it passes. The FMS pulls the incoming stream into the volume file, producing a new volume file at the FMS Volume Server 310. The file object is then created in the system at the business logic file server 325, and a reference or relation is used to associate the file with the object such as a data set or document at the FMS Rich Client Interface 300.

When dealing with partial file transfers, the user requests a particular piece of data, such as part of an assembly file (Step 400). A security ticket is generated (Step 405). If the piece of data is available at the FCC 305, then the FMS Rich Client application immediately reads the file fragment out of a shared virtual memory located in the local FCC cache (Step 410). If the piece of data is not available in the virtually shared mapped file memory, then the security ticket is sent to the FSC 315 to get the file fragment (Step 415). The file fragment is then returned to the user if it is cached at the FSC 315 (Step 415). If the file fragment is not in the FSC 315, then retrieve it from the FSC Volume Server 310 (Step 425). When the retrieved file fragment is returned to the FCC 305, it is written to the virtually mapped file memory, where the FMS Rich client application access it from the shared virtually mapped memory file to display to the user (Step 420 & 410). It is important to note that the FSC 315 is a private cache, i.e., there are not direct clients to the FSC 315 as it resides on a separate computer, and conversely FCC 305 is a shared cache so that other client program scan access it in process. Therefore, multiple rich client applications can run on the same fast cache concurrently so that the same data may be viewed by distinct applications.

Shared Virtually Mapped File Cache

Figure 5:
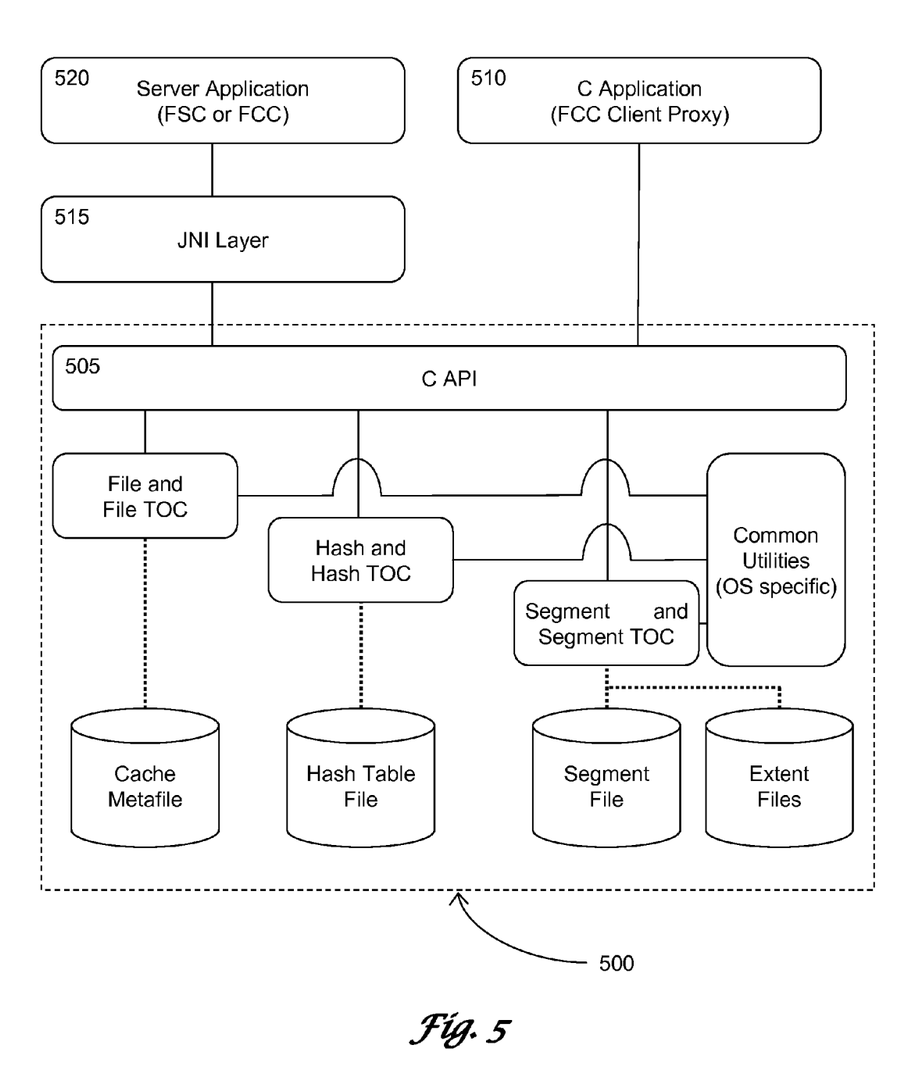
FIG. 5 is a block diagram of a sample relationship between external applications and a partial file cache.

Turning now from the system architecture to the internals of the partial file cache used by the server applications, FIG. 5 is a block diagram of a sample relationship between external applications and a partial file cache 500 that is written in C. Referring to FIG. 5, a C API (application programming interface) 505 is provided to interface the partial file cache in order to allow requests for services to be made of it by other C applications, for example a FCC Client Proxy 510. Also provided is a JNI layer 515 that is a programming framework that allows server applications 520 written in Java, like FCC 305 or FSC 315, to call and be called by the partial file cache.

Figure 6:
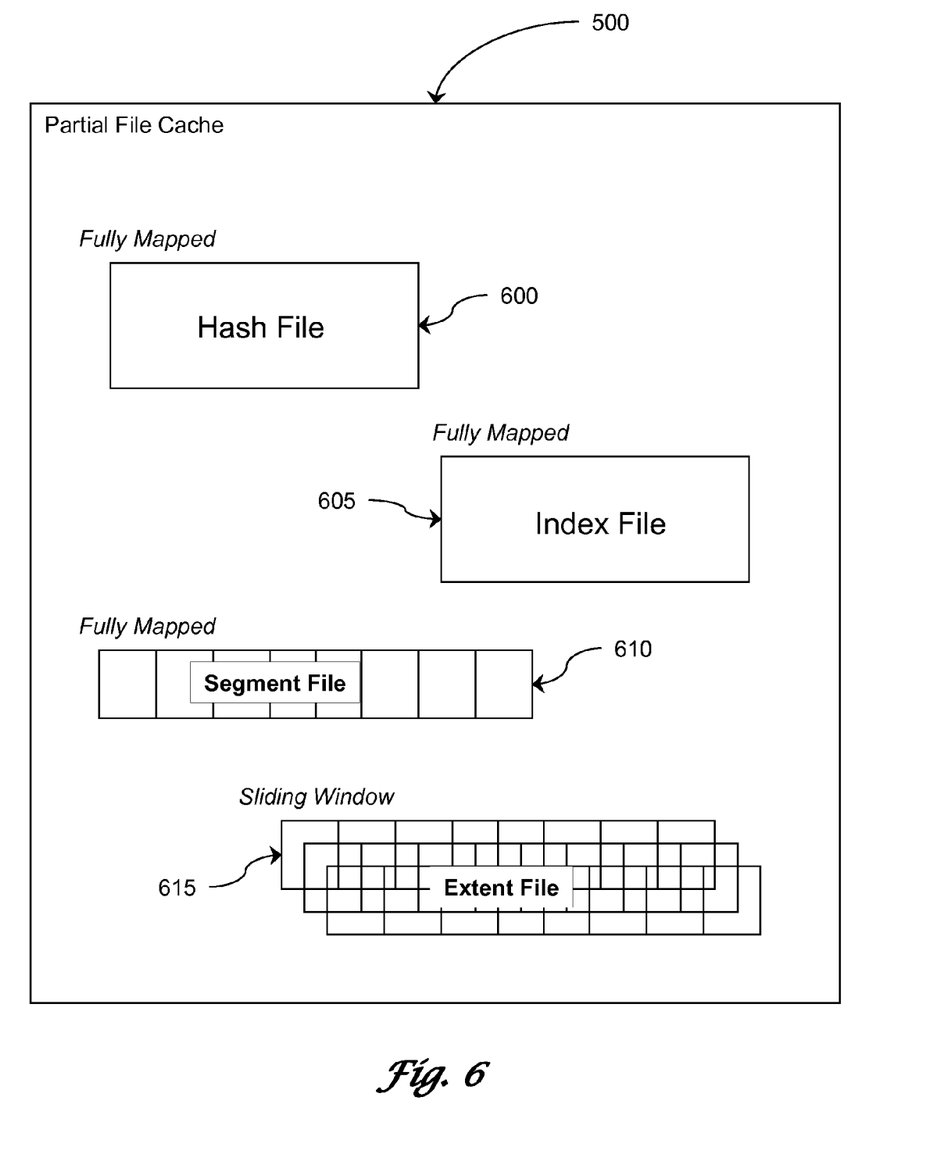
FIG. 6 is a block diagram of the partial file cache that highlights the four major data components.

FIG. 6 is a block diagram for the file structure of the partial file cache 500 of the presently preferred embodiment that highlights the four major data components accessed by both the FCC 305 and the FSC 315, whether for a read operation or for a write operation. As illustrated in FIG. 6, the partial file cache consists of the following data components: a hash file 600, an index file 605, and a data file fragment, e.g., a segment file 610 or an extent file 615.

Figure 7:
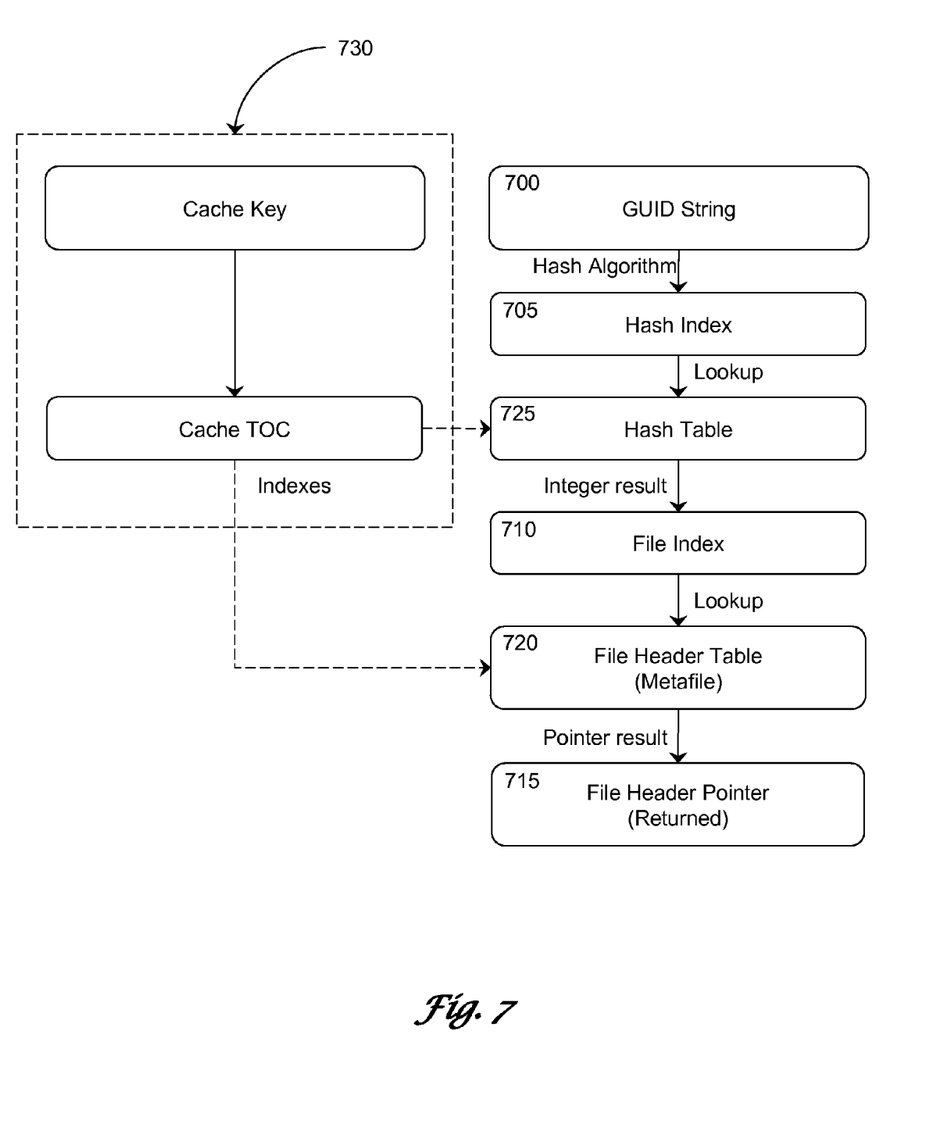
FIG. 7 is a data flow diagram for a partial file cache lookup.

FIG. 7 is a data flow diagram for a partial file cache lookup. Referring to FIG. 7, a GUID string 700 is fed through a hash algorithm to formulate a hash index 705 where each hash index 705 is an integer look-up into the file index 710 that is an entry to a file header pointer 715 in a file header table 720. In the presently preferred embodiment, each GUID string 700 appears in a hash table 725 only once or not at all. Additionally each hash index 705 is four bytes (32 bits) long, and each page is 512 bytes long, resulting in 128 entries per page. With 15-7813 pages, there are 1920 to 1,000,064 unique entries in the hash table 725, where the default is 15 hash pages. A cache TOC/key 730 is a shared memory area that indexes the file header table 720. The cache TOC/key 730 is provided by the FCC 305 and may be monitored by all clients in the FMS system. The cache TOC/key 730 enables the client to immediately access information in process, i.e., without having to make a round trip call to the FCC process. Thus the client has immediate access to any data that is already in place in the cache.

There is at least one file header pointer 715 per cached file GUID string 700 and contains information related specifically to that GUID string 700, e.g., the GUID string 700 itself and a file size (length). Additionally, the file header pointer 715 contains next and previous indices for other file headers referencing the same file GUID string 700. Further the file header pointer 715 contains 35 segment entries that references up to about 569 kilobytes of cached file data. And given that file header pointer 715 is the basic space allocation unit, all segments referenced by a file header are freed at the same time when memory is reallocated.

There are two types of allocated file header pointer 715, primary and secondary, for which there is a flag indicating either type. Referenced by the hash table 725, the primary file header is characterized as the first file header for a file and contains the index of the next primary file header with the same hash. The primary file header can also be referenced from a secondary file header's previous index or from a least recent list. Secondary file headers are characterized by referencing via the next/previous links in the same file GUID string 700, and extend to the amount of data a file header can reference.

Figure 8:
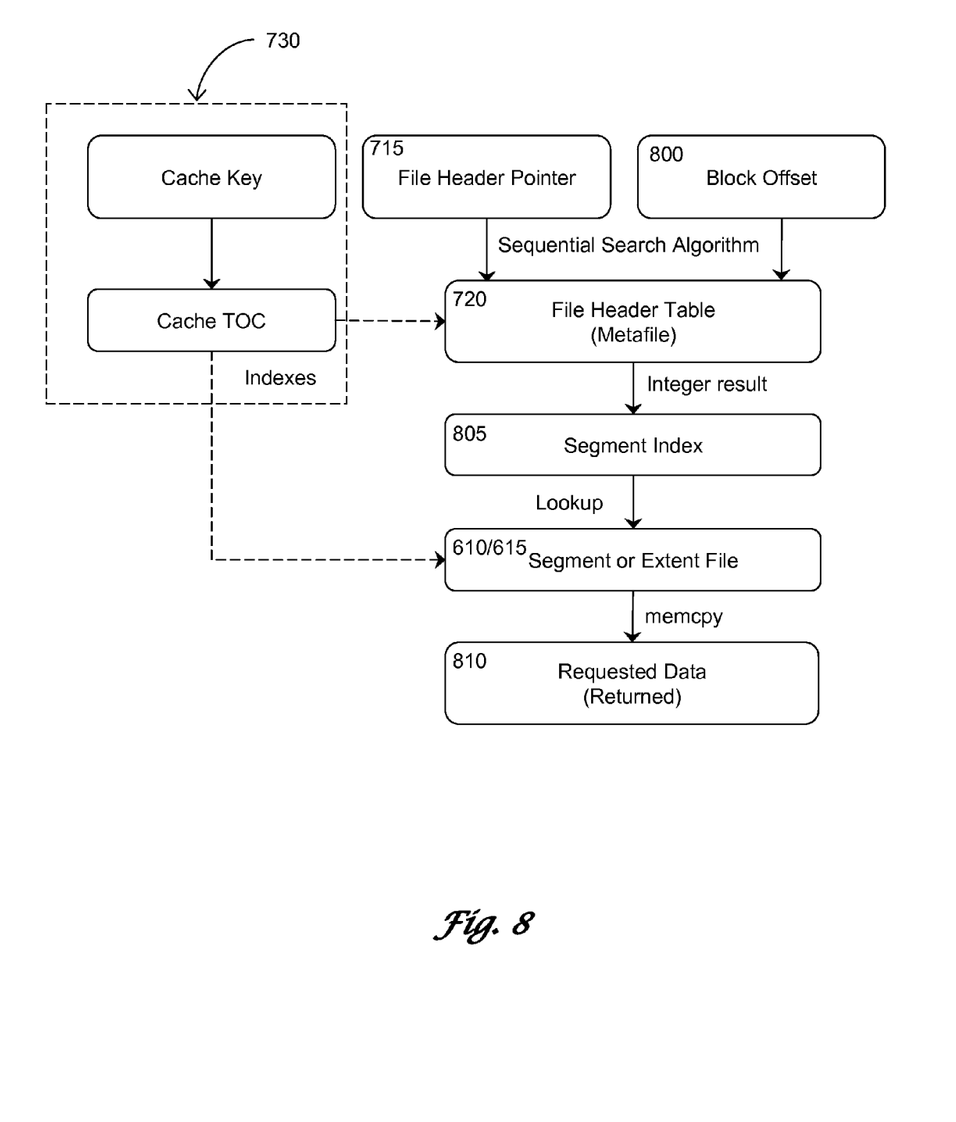
FIG. 8 is a data flow diagram for a partial file cache data lookup.

FIG. 8 is a data flow diagram for a partial file cache data lookup. Referring to FIG. 8, a block ID offset 800 and the file header pointer 710 are inputs to a sequential search algorithm applied to the file header table 720 whose integer result references a segment index 805. The segment index 805 is used to lookup a segment or an extent file 615, also indexed by the cache TOC/key 730, that contains the cached data segments, where each data segment is 16 kilobytes. In the presently preferred embodiment, the segment size can range from 32 kilobytes to 128 kilobytes, and defaults to 50 full file headers. It is important to note that the segment files are fully mapped into memory, whereas the extent files are mapped via sliding windows. A memory operation then returns a requested data 810 through the C API to the C application 510 or through the JNI layer 515 and to the server application 520.

CONCLUSION

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment, such as caching previously granted tickets at the FCC level, and avoid the performance penalty of the ticket check, i.e., only non-possessory tickets are received, for example. Further, the file structure could have another method of sending/receiving acknowledgement delay periods, that allow a sender to transmit a number of data units before an acknowledgement is received or a before a specific event occurs. Likewise, other caching methods to collecting data that duplicates the original stored elsewhere are within the teachings disclosed herein. Other caching methodologies can use heuristics to select the entry to based on factors such as latencies and throughput. Therefore, other implementations are within the scope of the following claims.

What is claimed is:

1. A method of caching a plurality of file fragments to improve file transfer performance, comprising the steps of:
receiving a write request from a product lifecycle management system in a network system, wherein the product lifecycle management system supports product visualization and design, and transmitting a write ticket in response;
receiving at least one file fragment in the network system from the product lifecycle management system for storage in a file management server system, the at least one file fragment transmitted between a plurality of intermediate points in a network system between the product lifecycle management system and the file management server system;
exposing the at least one file fragment as a primary object to an application;
caching said at least one file fragment in the file management server system and in each of the plurality of intermediate points in a network system; and
managing said at least one non-changing file fragment throughout said network system at a plurality of file management cache points, wherein the plurality of file management cache points each stores the at least one file fragment, an index file that references the at least one file fragment, and a hash index that references the index file.

2. The method of claim 1, comprising the additional step of requesting data having said file fragment associated therewith.

3. The method of claim 1, comprising the additional step of retrieving said file fragment from a shared cache, if said file fragment is present in said shared cache.

4. The method of claim 1, comprising the additional step of retrieving said file fragment from a private cache, if said file fragment is absent from a shared cache.

5. The method of claim 4, wherein said retrieval is authenticated by a security ticket.

6. The method of claim 1, comprising the additional step of displaying said file fragment from a shared cache to said application.

7. A method of accessing a cached file fragment, comprising the steps of:
requesting a file fragment by a product lifecycle management application that supports product visualization and design, the file fragment being one of a plurality of fragments of a single data file, and generating a security ticket;
executing a hash algorithm on an identifier corresponding to the requested file fragment to produce a hash index;
using the hash index as a look-up into a file index to locate the requested file fragment;
receiving said file fragment, whereby said file fragment is available to a plurality of applications; and
utilizing said file fragment by the product lifecycle management application without requiring the entire single data file.

8. The method of claim 7, wherein said file fragment is received from a shared mapped file memory on a first server.

9. A non-transitory machine readable medium encoded with instructions that, when executed, cause a computer to perform a method, comprising:
instructions for receiving a write request from a product lifecycle management system in a network system, wherein the product lifecycle management system supports product visualization and design, and transmitting a write ticket in response;
instructions for receiving at least one file fragment in the network system from the product lifecycle management system for storage in a file management server system, the at least one file fragment transmitted between a plurality of intermediate points in a network system between the product lifecycle management system and the file management server system;
instructions for exposing the at least one file fragment as a primary object to an application;
instructions for caching said at least one file fragment in the file management server system and in each of the plurality of intermediate points in a network system; and
instructions for managing said at least one non-changing file fragment throughout said network system at a plurality of file management cache points, wherein the plurality of file management cache points each stores the at least one file fragment, an index file that references the at least one file fragment, and a hash index that references the index file.

10. The machine readable medium of claim 9, comprising the additional step of requesting data having said file fragment associated therewith.

11. The machine readable medium of claim 9, comprising the additional step of retrieving said file fragment from a shared cache, if said file fragment is present in said shared cache.

12. The machine readable medium of claim 9, comprising the additional step of retrieving said file fragment from a private cache, if said file fragment is absent from a shared cache.

13. The machine readable medium of claim 12, wherein said retrieval is authenticated by a security ticket.

14. The machine readable medium of claim 9, comprising the additional step of displaying said file fragment from a shared cache to said application.

15. A non-transitory machine readable medium encoded with instructions that, when executed, cause a computer to perform a method of accessing a cached file fragment, comprising:
instructions for requesting a file fragment by a product lifecycle management application that supports product visualization and design, the file fragment being one of a plurality of fragments of a single data file, and generating a security ticket;
instructions for executing a hash algorithm on an identifier corresponding to the requested file fragment to produce a hash index;
instructions for using the hash index as a look-up into a file index to locate the requested file fragment;
instructions for receiving said file fragment, whereby said file fragment is available to a plurality of other product lifecycle management applications; and
instructions for utilizing said file fragment by the product lifecycle management application without requiring the entire single data file.

16. The machine readable medium of claim 15, wherein said file fragment is received from a shared mapped file memory on a first server.

17. A data processing system comprising a processor and accessible memory and configured to implement a method for caching a plurality of file fragments to improve file transfer performance by performing the steps of:
receiving a write request from a product lifecycle management system in a network system, wherein the product lifecycle management system supports product visualization and design, and transmitting a write ticket in response;

receiving at least one file fragment in the network system from the client product lifecycle management system for storage in a file management server system, the at least one file fragment transmitted between a plurality of intermediate points in a network system between the product lifecycle management system and the file management server system;

exposing the at least one file fragment as a primary object to an application;

caching said at least one file fragment in the file management server system and in each of the plurality of intermediate points in a network system; and managing said at least one non-changing file fragment throughout said network system at a plurality of file management cache points, wherein the plurality of file management cache points each stores the at least one file fragment, an index file that references the at least one file fragment, and a hash index that references the index file.

* * * * *